Jan. 13, 1942.   R. E. KELLER   2,269,668
AUTOMATIC TRANSMISSION
Original Filed March 14, 1934   2 Sheets-Sheet 1

INVENTOR.
REX E. KELLER
BY
ATTORNEY.

Jan. 13, 1942.  R. E. KELLER  2,269,668
AUTOMATIC TRANSMISSION
Original Filed March 14, 1934  2 Sheets-Sheet 2
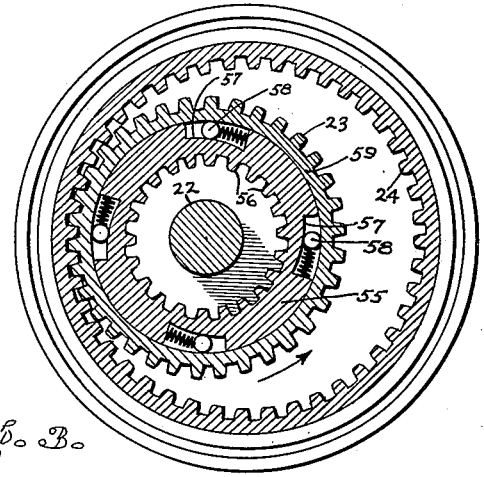
Fig. 3.
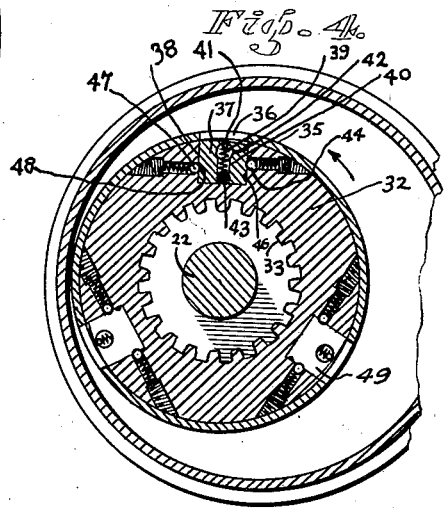
Fig. 4.
Fig. 5.
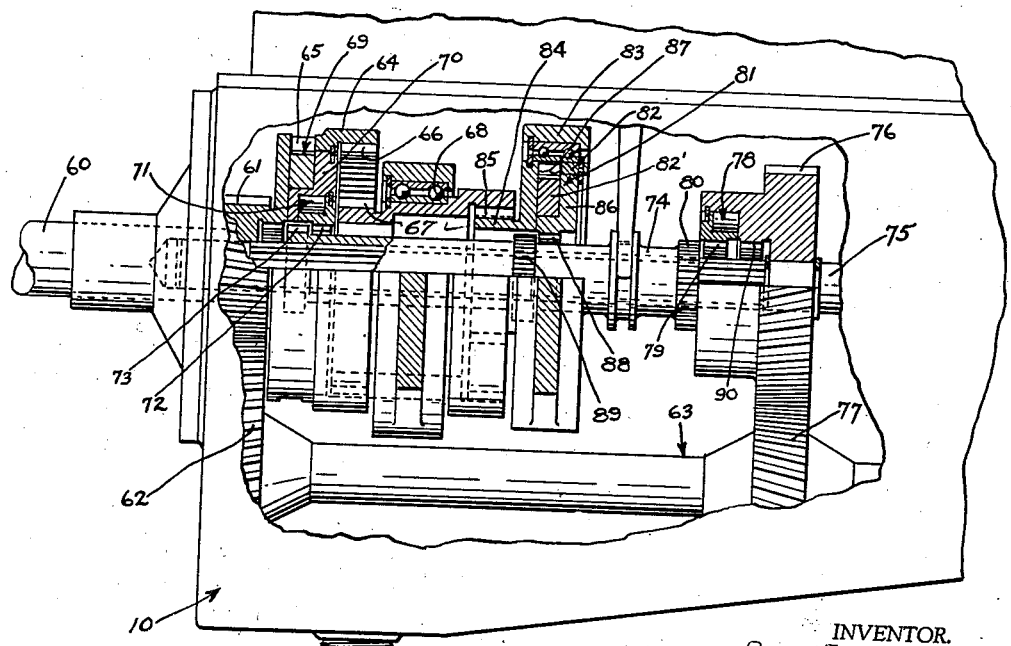
INVENTOR.
REX E. KELLER
BY
ATTORNEY.

Patented Jan. 13, 1942

2,269,668

UNITED STATES PATENT OFFICE 2,269,668

AUTOMATIC TRANSMISSION

Rex E. Keller, Beverly Hills, Calif.

Original application March 14, 1934, Serial No. 715,513. Divided and this application March 29, 1940, Serial No. 326,708

8 Claims. (Cl. 74—336)

This invention relates to transmission mechanisms and particularly the application of automatic speed changing mechanisms to various types and arrangements of power transmitting mechanisms operable for providing variable speed driving connections between a driving shaft and a driven shaft. The present application is a division of my application, Serial No. 715,513, for Automatic transmission, filed March 14, 1934.

As illustrated in the accompanying drawings, an automatic speed changing mechanism including driving and driven clutch members having a centrifugally operable bolt carried by one of said members and operable upon synchronization of the rotative speeds of said clutch members for positive locking engagement with the other of said clutch members, is provided for effecting changes in the ratio of the driving connection between a driving shaft and a driven shaft, between which shafts an overrunning clutch having an element operatively connected to each of said shafts is provided for effecting an initial one-way driving connection for initiating the rotation of said driven shaft and the clutch members connected thereto.

A principal object of the invention is to provide an overdrive transmission for driving a driven shaft at a rate faster than that of a driving shaft with an automatic speed changing mechanism for effecting a change from a direct to an overdrive with manually operable means whereby selective changes in the character and ratio of the driving connection may be made without regard to the automatic speed changing mechanism.

A further purpose of my invention is to provide automatic and selective transmission mechanism of the character described, in which one or more centrifugally operated clutches and one or more overrunning or free wheeling clutches are constructed, interrelated and combined with one another and with selective change speed gearing, in such a manner as to afford a highly desirable and efficient control, the transmission mechanism as a whole for providing free-wheeling, overdriving and change speed operations automatically and selectively, whereby to increase the convenience and safety factor of motor vehicle operation.

Other objects and advantages will be apparent from a reference to the following specification taken in conjunction with the accompanying drawings, of which there are five sheets and in which:

Fig. 3 is a sectional view taken on the plane of line 3—3 of Fig. 2, illustrating the details of the overrunning or free wheeling clutch;

Fig. 4 is a sectional view taken on the plane of line 4—4 of Fig. 2, illustrating the details of the centrifugally operated clutch which forms a part of the automatic speed changing mechanism; and Fig. 5 is a longitudinal vertical view, partly in section, illustrating a modification of my invention.

Figure 1:
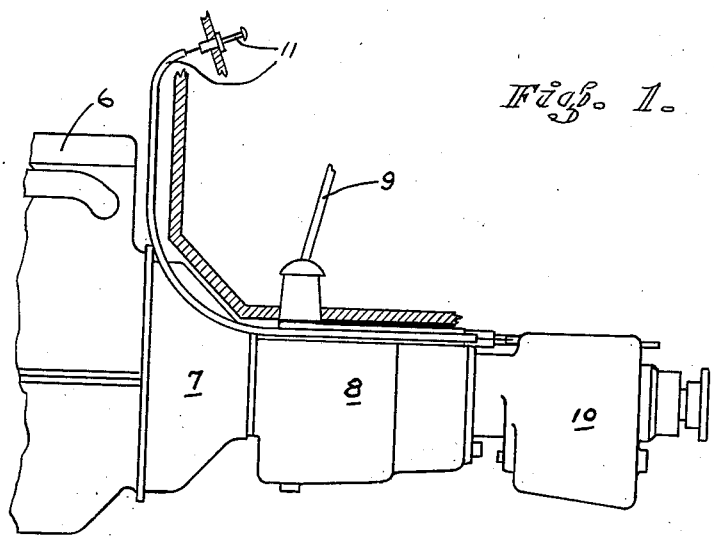
Fig. 1 is a diagrammatic side elevational view of a portion of an automotive vehicle and illustrating the application thereto of an overdrive transmission embracing my invention.

Referring now to Fig. 1 of the drawings, there is shown, more or less diagrammatically, a portion of an automotive vehicle having an engine 6, a housing-enclosed clutch mechanism 7, a change speed gearing 8 provided with a manipulative shift lever 9 for adjusting the same, and an overdrive transmission 10 provided with a dash control 11 for selectively adjusting the same.

Figure 2:
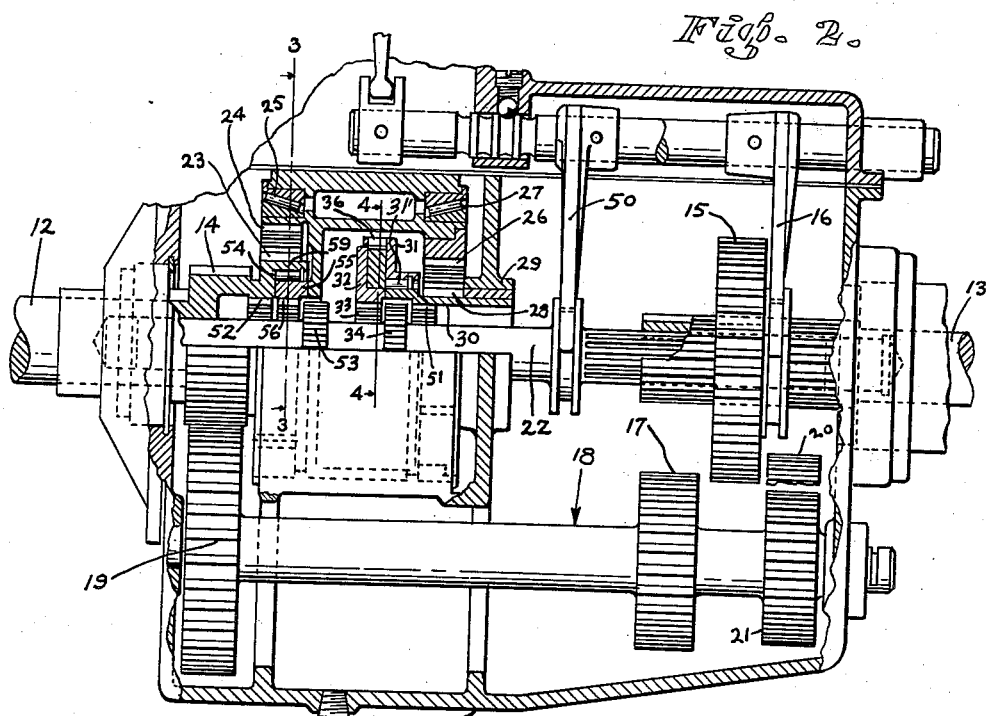
Fig. 2 is a longitudinal view, partly in section of automatic transmission mechanism embodying my invention.

In Fig. 2 of the drawings, there is illustrated an embodiment of the invention in which an overdrive is shown as incorporated in a selective change speed gearing having a driving shaft 12, a driven shaft 13, a gear 14 fixed to rotate with the driving shaft, a slidable gear 15 splined to the driven shaft for rotation therewith and adapted to be shifted by a yoke 16 to mesh with a gear 17 of a countershaft cluster of gears 18 having a gear 19 constantly in mesh with gear 14 and with an idler gear 20 constantly in mesh with a gear 21 of the countershaft gear cluster. An auxiliary or intermediate shaft 22 is journaled at its forward end in a counterbored end of the driving shaft 12 and at its rear end is slidably splined to the driven shaft 13. A gear 23, fixed to rotate with gear 14, is constantly in mesh with an internal gear 24 (see Fig. 3) mounted for rotation in suitable roller bearings 25, the axis of the gear 23 being eccentric with respect to that of gear 24. A second internal gear 26, smaller in size than that of gear 24, is suitably connected therewith and is mounted in suitable bearings 27 and is constantly in mesh with an external gear 28 journaled for rotation in a bearing 29, the axis of gear 28 being eccentric to that of gear 26. The gear 28 is provided with a flanged portion 30 which is adapted to provide a support for a centrifugally actuated clutch disclosed in Fig. 4, and has a drum-shaped clutch member 31 and a core clutch member 32 provided with an internal set of teeth 33 which are adapted to be meshed at times with a toothed clutch element 34 provided on the auxiliary shaft 22.

Referring to Fig. 4, it is seen that the flange 35 of the member 31 is provided with bolt engaging recesses 36 and that the core member 32 is nested within member 31 and provided with movable bolts 37 adapted to be projected into the recesses 36 for locking the clutch elements together. Each of the bolts 37 is mounted within a groove 38 in the core and normally retained therein by a spring 39 disposed within a bore 40 provided in the body of the bolt. One end of this spring is engaged with a pin 41 affixed to the core member 32 and extending through a relatively larger opening 42 in the bolt. The other end of this spring is engaged with an adjustable plug 43 threadedly secured within the bore 40. The clutch member 32 is provided with a spring-pressed poppet 44 backed by an adjustable plug 45 and bearing against one side of the bolt 37 and engageable in a notch 46 therein when the bolt is in its outer or projected position for delaying the inward movement of the bolt under influence of the spring 39. The bolt 37 is movable outwardly responsive to centrifugal force resulting from rotation of the clutch member 32 at a rate which may be selected by adjustment of the plug 43 to vary the tension of the spring 39 and by a second spring poppet 47 carried by the clutch element 32 and adapted to engage in a notch 48 for delaying the outward movement of the bolt. Since the spring-pressed poppets 44 and 47 delay the movement of the bolt from one of its positions to the other under the influence of centrifugal force or of the spring 39, there will be a difference between the rotative speeds of the clutch element 32 at which the bolt moves from one of its positions to the other. The spring-pressed poppets also will insure a quick positive movement of the bolts from one of their positions to the other end and avoid a hang-up of the same in an intermediate position. As indicated in Fig. 4, the clutch member 32 is provided with a bolt-engaging recess 36 for each of the bolts 37, although it will be appreciated that the number of recesses and bolts may be varied.

Each of the bolts 37 is provided with a bevelled tapered surface 49 which will cause the bolts to jump the recesses 36 until the rotative speeds of the core and drum clutch members are approximately synchronous, when the bolts will move outwardly under the action of centrifugal force and connect the elements of the clutch together. Deceleration of the rotative speed of the core clutch element 32 below that necessary to hold the bolts 37 in their outer position will permit the springs 39 to move the bolts inwardly, assuming that at such time, the torque between the shafts is released.

The shaft 22 is adapted to be shifted by a yoke 50. Gear 28 is provided with an internal set of teeth 51 affording an overdrive positive clutch element adapted to be meshed at times with the toothed clutch element 34 to provide a two-way overdrive connection between the driving and the driven shafts since gear 28 will be driven through the gears 24 and 26 at a faster rate than gear 23. Gear 23 is provided with an internal set of teeth 52 adapted to be meshed with a toothed clutch element 53 provided on shaft 26 and spaced from clutch element 34 to provide a two-way direct driving connection between the driving and the driven shafts. The gear 23 is also provided with an integral free wheeling or overunning clutch 54 of the type illustrated in Fig. 3 of the drawings and having a clutch element 55 provided with an internal set of teeth 56 which are adapted to be meshed with toothed clutch element 53 of the shaft 22 to provide a one-way or free wheeling driving connection between the driving and driven shafts for driving the driven shaft at the same rate of speed as that of the driving shaft.

The clutch element 55 is provided with a plurality of eccentric raceways 57 in which spring-pressed rollers 58 are mounted, said rollers being arranged to wedge between raceways and the flange portion 59 of the gear 23. When this flange portion is being driven in the direction of the arrow as indicated in Fig. 3, rollers 58 will be moved towards the smaller ends of the raceways 57 and lock the members 55 and 59 for joint rotation whereby the driven clutch element 55 will rotate. At this time the driven element 55 will be free to rotate in the same direction at a higher rate of rotation than the flange portion 59 as the rollers 58 will then be moved into the larger ends of the raceways and out of driving contact with the opposed surfaces of said raceways and flange portion.

Movement of the shaft 22 to connect toothed clutch element 34 with internal teeth 33 of the clutch element 32 of the centrifugally actuated clutch is simultaneously adapted to mesh toothed clutch element 53 with teeth 56 internally provided on the free wheeling clutch element 55 so that clutch element 32 of the centrifugally actuated clutch at such time is operatively connected to the driven shaft to rotate therewith while the drum-shaped clutch element 31 will be driven at a higher rate of speed since at such time it will rotate with gear 28.

Subsequent deceleration of the speed of the driving shaft 12 will slow down gear 28 and drum-shaped clutch element 31 rotatable therewith and permit the driven shaft 13 to continue rotating, the overrunning clutch 54 permitting the coasting of the driven shaft with the core clutch element 32 which at such time is connected to the driven shaft 13. When the rotative speeds of the clutch elements 31 and 32 are approximately synchronous, the bolts 37 will be projected into the bolt-engaging recesses 36 for interconnecting the members of the centrifugally actuated clutch, whereby the driven shaft 13 will be driven through the centrifugally actuated clutch, gear 28, internal gears 26 and 24 and gear 23 from the driving shaft 12 and at a faster rate of rotation than the latter.

It will be appreciated that greater increase in the ratio of the speed of the driven shaft to that of the driving shaft may be obtained by varying the size of the internal gears 24 and 26 with respect to those of the gears 23 and 28 and that the size of said internal gears might be so increased as to permit the countershaft of the gear cluster 18 to pass through the same. The power transmitting mechanism disclosed in this embodiment of my invention is adapted to be operated selectively as a three-speed transmission and provides as will now be apparent, an automatic change from a direct free wheeling drive to an overdrive free wheeling driving connection between the shafts and also selective operation for locking the same up in direct or in overdrive and locking out the centrifugally actuated clutch. Clutch member 31 is free-wheelingly connected with gear 28 by means of rollers 31' which seat in peripheral grooves of flange 30 of gear 28 and are spring urged and arranged in the same manner as the rollers 58 shown in Fig. 3.

In the modification disclosed in Fig. 5, a driving shaft 60 has affixed thereto a drive gear 61 meshing with a gear 62 of a countershaft gear cluster 63 and a drum 64 provided with one or more bolt-engaging recesses 65 and affording an internal gear 66 constantly in mesh with an external gear 67, journaled in a suitable bearing 68 and having its axis eccentric with respect to that of internal gear 66. The drum 64 provides the driving member of a centrifugally actuated clutch 69, such as disclosed in Fig. 4 of the drawings, and the driven member of which is provided by a core 70 nested within the drum 64 and affording the driving element of an overrunning clutch 71, the driven element of which is provided by an internal gear 72 which is adapted to be coupled with a toothed clutch element 73 formed upon one end of a shiftable clutch sleeve 74 which is slidably splined to the driven shaft 75.

The overrunning clutch 71 is of the type disclosed in Fig. 3 of the drawings, in which a spring-pressed roller is adapted to be wedged between the oppositely disposed surface portions of an eccentric raceway for locking two clutch elements for rotation in one direction. In the case where the overrunning clutch 71 is disposed between the core member 70 of the centrifugally actuated clutch and the driven shaft 75, it is essential that the tension or force of the spring (see Fig. 3) biasing the roller into the restricted portion of the raceway be greater than normal, so that when the core clutch member 70 which carries the slidable bolt 37 is not being driven, it will tend to coast along with the clutch sleeve 74. For the purpose of initiating the rotation of the driven shaft, a gear 76, mounted for free rotation on the driven shaft 75, is constantly in mesh with a gear 77 of the countershaft cluster of gears and is provided with a free wheeling or overrunning clutch 78, the driven element of which is provided with an internal set of teeth 79, which are adapted to be coupled with a toothed clutch element 80 provided on one end of the slidable sleeve 74 to provide a one-way reduced speed driving connection between the driving shaft and the driven shaft and through the intermediary of gears 61, 62, 76, 77 and overrunning clutch 78. The centrifugally actuated clutch 69 is of the type illustrated in Fig. 4 of the drawings and is adapted to provide automatic changes between a reduced and a direct driving connection between the driving and the driven shafts. When the bolt 37 of the centrifugally actuated clutch 69 is projected into one of the bolt-engaging recesses 65, responsive to centrifugal force resulting from rotation of the core clutch member 70, the drive between the shafts will be direct and through the centrifugally actuated clutch 69 and the overrunning clutch 71, which will permit the driven shaft 75 and sleeve 74 to rotate at a rate in excess of that of the driving shaft 60 such as when the speed of the driving shaft is reduced by a slowing down of the engine.

A second centrifugally actuated clutch 81, similar in all respects to clutch 69, is provided for effecting an automatic change from a direct to an overdrive and comprises a clutch drum 82, mounted for rotation in a bearing 83 and provided with an integral external gear 84 which is in constant mesh with an internal gear 85 formed integral with gear 67. The core clutch element 86 of the centrifugally actuated clutch 81 is provided with one or more bolts 82', which are adapted to be projected into the bolt-engaging recesses 87 provided in the clutch drum 82 for interlocking the core 86 to the drum 82. The clutch core 86 is provided with an internal set of teeth 88 which are adapted to be coupled with a toothed clutch member 89 formed on the sleeve 74 so that when said sleeve is shifted to the right, the core clutch members of centrifugally actuated clutches 69 and 81 will be operatively connected to the driven shaft 75, which initially will be driven by the intermediate speed gear 76 since at such time the driven element of the overrunning clutch 78 will be coupled to the toothed clutch element 80.

While the centrifugally actuated clutches 69 and 81 are similar in construction and operation, the bolts 82' of the clutch 81 will be set to be moved under the influence of the centrifugal force at a higher rate of rotation of the driven shaft than the bolt 37 of the centrifugally actuated clutch 69, so that when accelerating during the time the driven shaft is being driven through the overrunning clutch 78, the centrifugally actuated clutch 69 will operate first to provide a direct driving connection between the shafts, and subsequently when the driven shaft attains a higher rate of speed, the centrifugally actuated clutch 81 will operate to change from a direct to an overdrive connection between the shafts. The intermediate speed gears 76 may be provided with an internal set of teeth 90 to which the toothed clutch element 80 may be coupled for providing a positive or two-way driving connection between the gear 76 and the driven shaft 75, in which event the centrifugally actuated clutches 69 and 81 cannot operate, since the core members of the clutches cannot then be driven by gears 73 and 89 and therefore cannot be synchronized with the drum-shaped members of the clutches due to the gears 73 and 89 being disposed to the right of a meshing relation to gears 72 and 88 respectively provided on the core members.

The internal and external gears 66, 67, 85 and 84 provide a means whereby the drum 82 of the centrifugally actuated clutch 81 can be driven at a rate in excess of that of the driving shaft 60, so that when the core member 86 on said centrifugally actuated clutch is locked to the drum 82, the driven shaft 75 will be driven at a rate in excess of that of the driving shaft 60.

What I claim is:

1. An overdrive transmission having in combination a driving shaft and a driven shaft, an overrunning clutch having an element thereof adapted to be rotated by said driving shaft and a driven element adapted to be driven in one direction thereby, an internal gear drivingly connected with said driving shaft, an external gear of smaller diameter in constant mesh with said internal gear, a centrifugally actuated clutch including a drum provided with a bolt-engaging recess drivingly connected with said external gear for rotation therewith and at a rate faster than that of said driving shaft and a core nested within said drum and provided with a tensioned bolt movable responsive to centrifugal force resulting from the rotation thereof at a predetermined rate, a slidable shaft splined to said driven shaft and provided with a pair of spaced clutch elements, means for shifting said slidable shaft for coupling the clutch elements thereof with said overrunning clutch driven element and said core, respectively, to provide a one-way driving connection between said driving and driven shafts and for driving said core at a rate lower than that of said drum, said centrifugally actuated clutch being provided with means associated with said bolt and operable for holding the same out of said recess until the relative rotation between said drum and core has been substantially eliminated, said bolt upon movement thereof into said recess being adapted to provide a driving connection between said shafts around said overrunning clutch and at a higher ratio than that provided by said one-way driving connection.

2. An overdrive transmission having in combination a driving shaft and a driven shaft, an overrunning clutch having an element thereof adapted to be rotated by said driving shaft and a driven element adapted to be driven in one direction thereby, an internal gear drivingly connected with said driving shaft, an external gear of smaller diameter in constant mesh with said internal gear, a centrifugally actuated clutch including a drum provided with a bolt-engaging recess drivingly connected with one of said gears for rotation therewith and at a rate at variance with that of said driving shaft and a core nested within said drum and provided with a bolt movable responsive to centrifugal force resulting from the rotation thereof at a predetermined rate, a slidable shaft splined to said driven shaft and provided with a pair of speed clutch elements, means for shifting said slidable shaft for coupling the clutch elements thereof with said overrunning clutch driven element and said core, respectively, to provide a one-way direct driving connection between said driving and driven shafts and for driving said core at a rate at variance with that of said drum, said centrifugally actuated clutch being provided with means associated with said bolt and operable for holding the same out of said recess until the relative rotation between said drum and core has been substantially eliminated, said bolt upon movement thereof into said recess being adapted to provide a driving connection between said shafts around said overrunning clutch and at a ratio at variance with that provided by said one-way driving connection.

3. An overdrive transmission having in combination a driving shaft and a driven shaft, an overrunning clutch having an element thereof adapted to be rotated by said driving shaft and a driven element adapted to be driven in one direction thereby, an internal gear drivingly connected with said driving shaft, an external gear of smaller diameter in constant mesh with said internal gear, a centrifugally actuated clutch including a drum provided with a bolt-engaging recess drivingly connected with said external gear for rotation therewith and at a rate faster than that of said driving shaft and a core nested within said drum and provided with a bolt movable responsive to centrifugal force resulting from the rotation thereof at a predetermined rate, clutch elements, means for drivingly connecting said elements with the driven shaft, means for coupling the clutch elements with said overrunning clutch driven element and said core, respectively, to provide a one-way direct driving connection between said driving and driven shafts and for driving said core at a rate lower than that of said drum, said centrifugally actuated clutch being provided with means associated with said bolt and operable for holding the same out of said recess until the relative rotation between said drum and core has been substantially eliminated, said bolt upon movement thereof into said recess being adapted to provide a driving connection between said shafts around said overrunning clutch and at a higher ratio than that provided by said one-way driving connection.

4. An overdrive transmission having in combination a driving shaft and a driven shaft, an over-running clutch having an element thereof adapted to be rotated by said driving shaft and a driven element adapted to be driven in one direction thereby, an internal gear drivingly connected with said driving shaft, an external gear of smaller diameter in constant mesh with said internal gear, a centrifugally actuated clutch including a member provided with a bolt-engaging recess drivingly connected with said external gear for rotation therewith and at a rate faster than that of said driving shaft and another clutch member associated with said first named member of the centrifugally operated clutch and provided with a bolt movable responsive to centrifugal force resulting from the rotation thereof at a predetermined rate, a slidable shaft splined to said driven shaft and provided with a pair of speed clutch elements, means for shifting said slidable shaft for coupling the clutch elements thereof with said overrunning clutch driven element and said second named member of the centrifugally operated clutch respectively, to provide a one-way direct driving connection between said driving and driven shafts and for driving said second named centrifugal clutch member at a rate lower than that of the first named centrifugal clutch member, said centrifugally actuated clutch being provided with means operable for holding the bolt out of said recess until the relative rotation between said centrifugal clutch members have been substantially eliminated, said bolt upon movement thereof into said recess being adapted to provide a driving connection between said shafts around said over-running clutch and at a higher ratio than that provided by said one-way driving connection.

5. A transmission having in combination a driving shaft and a driven shaft, an overrunning clutch having an element thereof rotatable with said driving shaft and a driven element adapted to be driven in one direction thereby, a gear drivingly connected with said driving shaft, a gear of a different diameter than and in constant mesh with the first named gear, a centrifugally actuated clutch including a member provided with a bolt-engaging recess drivingly connected with the second named gear for rotation therewith and at a rate at variance with that of said driving shaft and another centrifugal clutch member associated with the first named centrifugal clutch member and provided with a bolt movable responsive to centrifugal force resulting from the rotation thereof at a predetermined rate, clutch elements, means for coupling the clutch elements for rotation with the driven shaft, means for coupling said clutch elements with said overrunning clutch driven element and the second named centrifugal clutch member, respectively, to provide a one-way direct driving connection between said driving and driven shafts and for driving said second named centrifugal clutch member at a rate at variance with that of said first named centrifugal clutch member, said centrifugally actuated clutch being provided with means operable for holding the bolt out of said recess until the relative rotation between said centrifugal clutch members have been substantially eliminated, said bolt upon movement thereof into said recess being adapted to provide a driving connection between said shafts around said overrunning clutch and at a ratio at variance with that provided by said one-way driving connection.

6. An overdrive transmission as characterized in claim 1 including: means associated with said bolt and operable for retarding the movement of the bolt from its outermost to its innermost position until the tension applied to the bolt overcomes centrifugal force.

7. An overdrive transmission as characterized in claim 1 including: means for operatively connecting said slidable shaft and said external gear for providing a two-way overdrive connection between the driving shaft and the driven shaft.

8. An overdrive transmission having in combination a driving shaft and a driven shaft, an overrunning clutch having an element thereof adapted to be rotated by said driving shaft and a driven element adapted to be driven in one direction thereby, an internal gear drivingly connected with said driving shaft, an external gear of smaller diameter in constant mesh with said internal gear, a centrifugally actuated clutch including a drum provided with a bolt-engaging recess drivingly connected with said external gear for rotation therewith and at a rate faster than that of said driving shaft and a core nested within said drum and provided with a bolt movable responsive to centrifugal force resulting from the rotation thereof at a predetermined rate, a slidable shaft splined to said driven shaft and provided with a pair of spaced clutch elements, means for shifting said slidable shaft for coupling the clutch elements thereof with said overrunning clutch driven element and said core, respectively, to provide a one-way driving connection between said driving and driven shafts and for driving said core at a rate lower than that of said drum, said centrifugally actuated clutch being provided with means associated with said bolt and operable for retarding the movement of the bolt into and out of said recess until the relative rotation between said drum and said core has been substantially eliminated and centrifugal force is overcome to effect the disengagement of the bolt, respectively, said bolt when engaged with said recess adapted to provide a driving connection between said shafts around said overrunning clutch at a higher rate than that provided by said one-way driving connection.

REX E. KELLER.